(12) United States Patent
Nakamura

(10) Patent No.: US 7,684,661 B2
(45) Date of Patent: Mar. 23, 2010

(54) OPTICAL MODULE AND METHOD OF PRODUCING OPTICAL MODULE

(75) Inventor: Akira Nakamura, Machida (JP)

(73) Assignee: Mitsumi Electric Co., Ltd., Tama-shi (JP)

( * ) Notice: Subject to any disclaimer, the term of this patent is extended or adjusted under 35 U.S.C. 154(b) by 0 days.

(21) Appl. No.: 12/087,958

(22) PCT Filed: Dec. 14, 2006

(86) PCT No.: PCT/JP2006/324939

§ 371 (c)(1),
(2), (4) Date: Jul. 18, 2008

(87) PCT Pub. No.: WO2007/086206

PCT Pub. Date: Aug. 2, 2007

(65) Prior Publication Data

US 2009/0080831 A1    Mar. 26, 2009

(30) Foreign Application Priority Data

Jan. 25, 2006 (JP) .............................. 2006-016243

(51) Int. Cl.
*G02B 6/12* (2006.01)
*H01L 21/00* (2006.01)

(52) U.S. Cl. .............................. 385/14; 385/49; 385/88; 385/92; 438/29; 438/42

(58) Field of Classification Search .................... 385/53, 385/65, 59, 71, 76, 77, 83, 88, 89, 92, 93, 385/94, 95, 96, 97, 98, 99, 14, 49; 438/29, 438/31, 42

See application file for complete search history.

(56) References Cited

U.S. PATENT DOCUMENTS 5,073,003 A * 12/1991 Clark .......................... 385/33

(Continued)

FOREIGN PATENT DOCUMENTS

CN    1673789 A    9/2005

OTHER PUBLICATIONS

Japanese Office Action dated Feb. 17, 2009 (4 pages), and English translation thereof (7 pages), issued in counterpart Japanese Application Serial No. 2006-016243.

(Continued)

*Primary Examiner*—Brian M Healy
(74) *Attorney, Agent, or Firm*—Frishauf, Holtz, Goodman & Chick, PC

(57) ABSTRACT

An optical module where breaking of an optical fiber is avoided to improve ease of handling in the assembly process of the module and mechanical reliability of the module including resistance to impact. The optical module has a PD (3) and an optical fiber (5a) that are mounted on the same substrate (2). A covering section (6) for covering the optical fiber (5a) is placed on a deep trench section (24) having a predetermined depth in the Z2 direction from a V-groove-formed surface where a V-groove for mounting the optical fiber (5a) is formed. The distance h from an end face (3a) of the PD (3) to an end face (24a) of the deep trench section (24) and the distance k from an end face (51a) of the optical fiber (5a) to an end face (6a) of the covering section (6) satisfy the relationship of h>k. The optical fiber (5a) is mounted with both the end face (6a) of the covering section (6) and the end face (24a) of the deep trench section (24) made to be in contact with each other.

8 Claims, 7 Drawing Sheets

U.S. PATENT DOCUMENTS

| | | | |
|---|---|---|---|
| 5,179,609 A | 1/1993 | Blonder et al. | |
| 5,748,822 A * | 5/1998 | Miura et al. | 385/90 |
| 5,907,649 A | 5/1999 | Acklin et al. | |
| 6,282,352 B1 | 8/2001 | Kato et al. | |
| 6,309,113 B1 * | 10/2001 | Naito | 385/88 |
| 6,808,322 B2 * | 10/2004 | Freund et al. | 385/92 |
| 7,314,317 B2 | 1/2008 | Hamasaki et al. | |
| 2002/0003933 A1 * | 1/2002 | Sherrer et al. | 385/83 |
| 2009/0080831 A1 * | 3/2009 | Nakamura | 385/14 |

FOREIGN PATENT DOCUMENTS

| | | |
|---|---|---|
| JP | 58-128408 U | 8/1983 |
| JP | 5-60945 A | 3/1993 |
| JP | 6-88925 A | 3/1994 |
| JP | 6-120564 A | 4/1994 |
| JP | 9-26529 A | 1/1997 |
| JP | 9-133833 A | 5/1997 |
| JP | 10-506204 A | 6/1998 |
| JP | 11-84175 A | 3/1999 |
| JP | 11-211928 A | 8/1999 |
| JP | 2001-36181 A | 2/2001 |
| JP | 2003-215392 A | 7/2003 |
| JP | 2004-157558 A | 6/2004 |
| JP | 2005-309367 A | 11/2005 |
| WO | WO98/45741 A1 | 10/1998 |

OTHER PUBLICATIONS

Japanese Office Action dated Apr. 28, 2009 (2 pages), and English translation thereof (3 pages), issued in counterpart Japanese Application Serial No. 2006-016243.

Chinese Office Action dated Jul. 24, 2009 and English translation thereof issued in a counterpart Chinese Application No. 2006800441671.

* cited by examiner

OPTICAL MODULE AND METHOD OF PRODUCING OPTICAL MODULE

This application is a U.S. National Phase Application under 35 USC 371 of International Application PCT/JP2006/324939 filed Dec. 14, 2006.

TECHNICAL FIELD

The present invention relates to an optical module where an optical fiber and an optical component are integrated on one substrate and a method of producing the optical module.

BACKGROUND ART

In recent years, with the increase in speed of data communication, optical communication, which enables broadband communication with low loss, is replacing communication using metallic cables and becoming widespread. In optical communication, alignment performed when a cable is connected is important, and for example, alignment of an optical fiber such as forming a V-shaped groove (hereinafter referred to as V-groove) on a substrate and fixing the optical fiber in the V-groove is performed (for example, see patent document 1).

Also, in an optical module where an optical fiber and various optical components are integrated on one substrate, alignment of an optical axis using a V-groove for mounting an optical fiber is performed. An optical component is a component used in optical communication and includes a light-emitting element such as a Laser Diode (hereinafter referred to as LD), a light receiving element such as a Photo Diode (hereinafter referred to as PD), an optical waveguide, a mirror, a polarizer, etc.

FIG. 6A, FIG. 6B and FIG. 6C show a structure of an optical module 31. FIG. 6A is a top view showing an optical module 31, FIG. 6B is a cross-sectional view showing a cross-section taken along P-P shown in FIG. 6A, FIG. 6C is an end view showing an end face taken along Q-Q shown in FIG. 6A.

As shown in FIG. 6A, the optical module 31 is structured by a substrate 32 mounted with a PD 33, an LD 34 and optical fibers 35a and 35b. As shown in FIG. 6C, V-grooves 323a and 323b are formed on the substrate 32, and when the optical fibers 35a and 35b are mounted on the V-grooves 323a and 323b, the optical axes of the PD 33 and the LD 34 are aligned with those of the optical fibers 35a and 35b, respectively.

Patent Document 1: Japanese Patent Application Laid-Open Publication No. H11-211928

DISCLOSURE OF THE INVENTION

Problems to be Solved by the Invention

However, as shown in FIG. 6B, in the optical module 31, since the uncovered optical fibers 35a and 35b abut the ends 36 of the V-grooves 323a and 323b, stress concentration occurs in the boundary between the portions of the optical fibers 35a and 35b fixed on the substrate 32 and those unfixed on the substrate 32 and there is a possibility that the optical fibers 35a and 35b break. Thus, there is a problem in the ease of handling in the assembly process and the mechanical reliability including resistance to impact.

The present invention has been made in consideration of the problems of the above-described techniques, and it is an object to avoid breaking of an optical fiber to improve ease of handling in the assembly process and mechanical reliability including resistance to impact.

Means for Solving the Problem

In order to achieve the above object, according to a first aspect of the present invention, there is provided an optical module in which an optical component and an optical fiber are mounted on a same substrate, and an end face of the optical component where light enters or exits faces an end face of an axis direction of the optical fiber, wherein:

a V-groove is formed on the substrate to mount the optical fiber;

a deep trench section is formed at an edge of the substrate with a predetermined depth deeper than a position of a V-groove formed face on the substrate; and a covering section is placed in the deep trench section, the covering section covering the optical fiber.

Preferably, a distance h from the end face of the optical component facing the end face of the optical fiber to an end face of the deep trench section and a distance k from the end face of the optical fiber facing the end face of the optical component to an end face of the covering section facing an exposed side of the optical fiber satisfy a relationship of $h>k$.

Preferably, the substrate and the covering section respectively include an alignment concavo-convex section.

According to a second aspect of the present invention, there is provided a method of producing an optical module in which an optical component and an optical fiber are mounted on a same substrate, and an end face of the optical component where light enters or exits faces an end face of an axis direction of the optical fiber, the method comprising:

forming a V-groove on the substrate to mount the optical fiber;

forming a deep trench section at an edge of the substrate with a predetermined depth deeper than a position of a V-groove formed face on the substrate; and mounting the optical fiber in the V-groove as well as placing a covering section in the deep trench section, the covering section covering the optical fiber.

Preferably, a distance h from the end face of the optical component facing the end face of the optical fiber to an end face of the deep trench section and a distance k from the end face of the optical fiber facing the end face of the optical component to an end face of the covering section facing an exposed side of the optical fiber satisfy a relationship of $h>k$; and the optical fiber is mounted by abutting the end face of the covering section to the end face of the deep trench section.

Preferably, an alignment concavo-convex section is formed on the substrate and the covering section, respectively; and the position of the optical fiber is defined by fitting the alignment concavo-convex section formed on the substrate with the alignment concavo-convex section formed on the covering section.

Preferably, the V-groove and the deep trench section are formed by anisotropic wet etching processing on the substrate.

Preferably, the V-groove and the deep trench section are formed by cutting processing on the substrate.

Advantageous Effect of the Invention

According to the present invention, since a covering section is placed in a deep trench section formed on an edge of a substrate and an optical fiber does not directly abut the edge of the substrate, breaking of the optical fiber can be avoided to enhance ease of handling in the assembly process and mechanical reliability including resistance to impact.

Element destruction caused by contact between an end face of the optical fiber and an end face of the optical component can be avoided, and since the optical fiber is mounted by abutting the end face of the covering section to the end face of the deep trench section, the optical fiber can be placed in an accurate position.

The optical fiber can be placed in an accurate position with an alignment concavo-convex section of the substrate and the covering section.

By anisotropic wet etching processing on the substrate, a V-groove and the deep trench section can be formed at the same time, and consequently, the production process can be simplified.

By cutting processing on the substrate, the V-groove and the deep trench section can be formed.

BEST MODE FOR CARRYING OUT THE INVENTION

FIRST EMBODIMENT

An optical module 1 of the first embodiment of the present invention will be described.

Figure 1A:
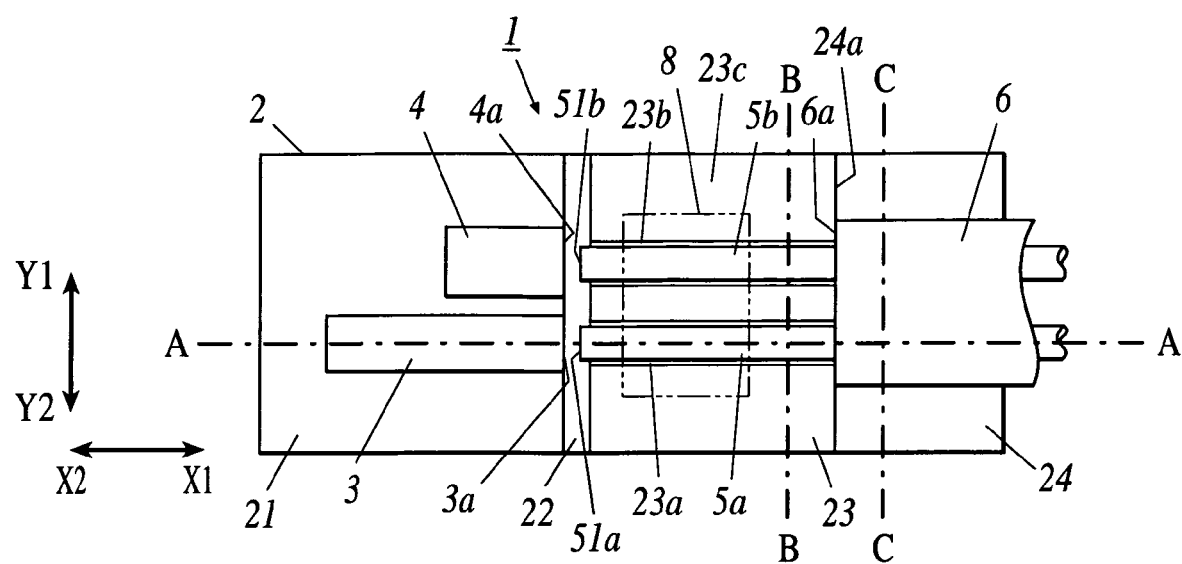
FIG. 1A is a top view showing an optical module 1 of the first embodiment.
Figure 1B:
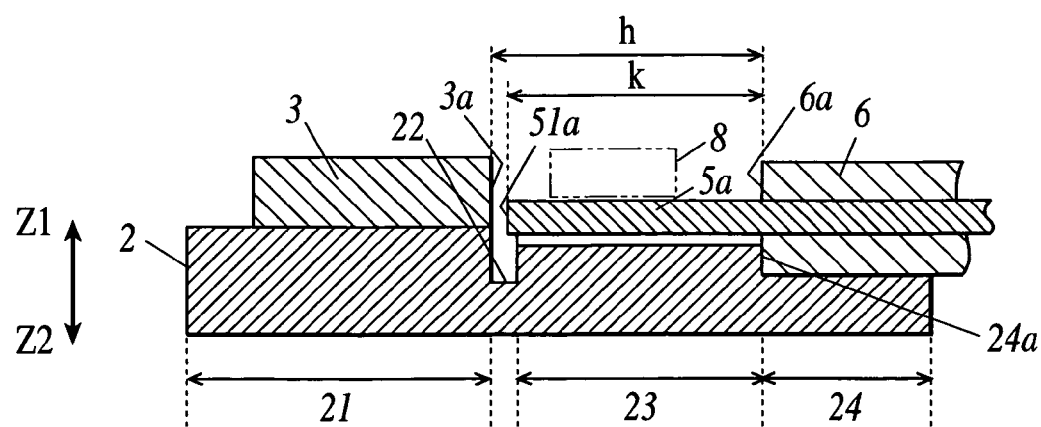
FIG. 1B is a cross-sectional view showing a cross-section taken along A-A shown in FIG. 1A.
Figure 1C:
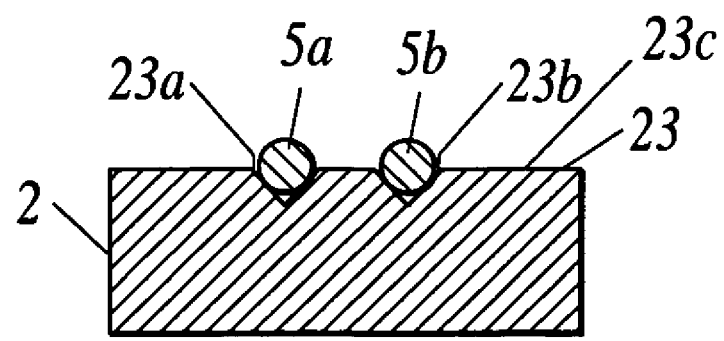
FIG. 1C is an end view showing an end face taken along B-B shown in FIG. 1A.
Figure 1D:
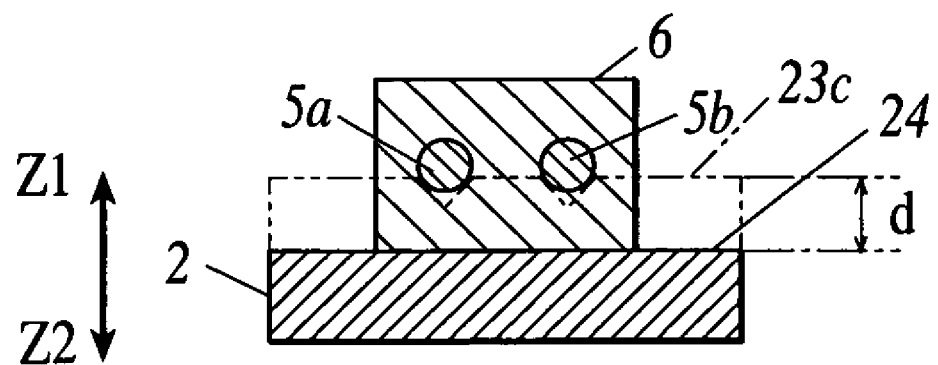
FIG. 1D is an end view showing an end face taken along C-C shown in FIG. 1A.

FIG. 1A is a top view showing an optical module 1 of the first embodiment, FIG. 1B is a cross-sectional view showing a cross-section taken along A-A shown in FIG. 1A, FIG. 1C is an end view showing an end face taken along B-B shown in FIG. 1A, and FIG. 1D is an end view showing an end face taken along C-C shown in FIG. 1A.

As shown in FIG. 1A, the optical module 1 is structured by a substrate 2 mounted with a PD 3, an LD 4 and optical fibers 5a and 5b. The optical fibers 5a and 5b are covered with a covering section 6, and a portion is exposed. The exposed portions of the optical fibers 5a and 5b are fixed with a cover glass 8 from above.

The substrate 2 is a plate-type substrate made of single-crystal silicon (Si), and as shown in FIG. 1A and FIG. 1B, the substrate 2 is configured with an optical component setting section 21, a groove 22, a V-groove forming section 23 and a deep trench section 24.

On the optical component setting section 21, the PD 3 and the LD 4 are set as optical components.

The groove 22 is a groove provided on the substrate 2 in a direction orthogonal to the extending direction (X1-X2 direction shown in FIG. 1A) of the substrate 2 (Y1-Y2 direction shown in FIG. 1A).

As shown in FIG. 1C, V-grooves 23a and 23b are formed on a V-groove forming face 23c of the V-groove forming section 23. The V-grooves 23a and 23b are provided in streaks in an extending direction of the substrate 2 (X1-X2 direction shown in FIG. 1A). The V-grooves 23a and 23b are designed so that when the optical fibers 5a and 5b are mounted on the V-grooves 23a and 23b, the optical axes of the PD 3 and the LD 4 match those of the cores of the optical fibers 5a and 5b respectively.

As shown in FIG. 1B and FIG. 1D, the deep trench section 24 is formed on an edge of the substrate 2, and the deep trench section 24 is deeper than the position of the V-groove forming face 23c by a predetermined depth d in a direction Z2. The depth d of the deep trench section 24 is designed so that when the optical fibers 5a and 5b are mounted on the V-grooves 23a and 23b, the bottom face of the covering section 6 covering the optical fibers 5a and 5b is in contact with the face of the deep trench section 24.

The PD 3 is a light-receiving element for converting light transmitted by the optical fiber 5a into an electrical signal. The LD 4 is a light-emitting element for emitting light according to an electrical signal externally supplied. The end face 3a for incoming light of the PD 3 faces the end face 51a of the axial direction of the optical fiber 5a and the end face 4a of the outgoing light of the LD 4 faces the end face 51b of the axial direction of the optical fiber 5b.

The optical fibers 5a and 5b have a double-layered structure of a core and a cladding covering the core, and since the refractive index of the core is higher than that of the cladding, the light is transmitted by total reflection.

The covering section 6 is a cover material for covering the optical fibers 5a and 5b.

As shown in FIG. 1B, a distance h from the end face 3a of the PD 3 facing the end face 51a of the optical fiber 5a to the end face 24a of the deep trench section 24 and a distance k from the end face 51a of the optical fiber 5a facing the end face 3a of the PD 3 to the end face 6a of the covering section 6 facing the exposed side of the optical fiber 5a satisfy a relationship of h>k. The distance from the end face 4a of the LD 4 facing the end face 51b of the optical fiber 5b to the end face 24a of the deep trench section 24 is equal to the distance h, and the distance from the end face 51b of the optical fiber 5b facing the end face 4a of the LD 4 to the end face 6a of the covering section 6 is equal to the distance k.

Next, the producing method of the optical module 1 will be described with reference to FIG. 2A, FIG. 2B, FIG. 3A, FIG. 3B and FIG. 3C.

Figure 2A:
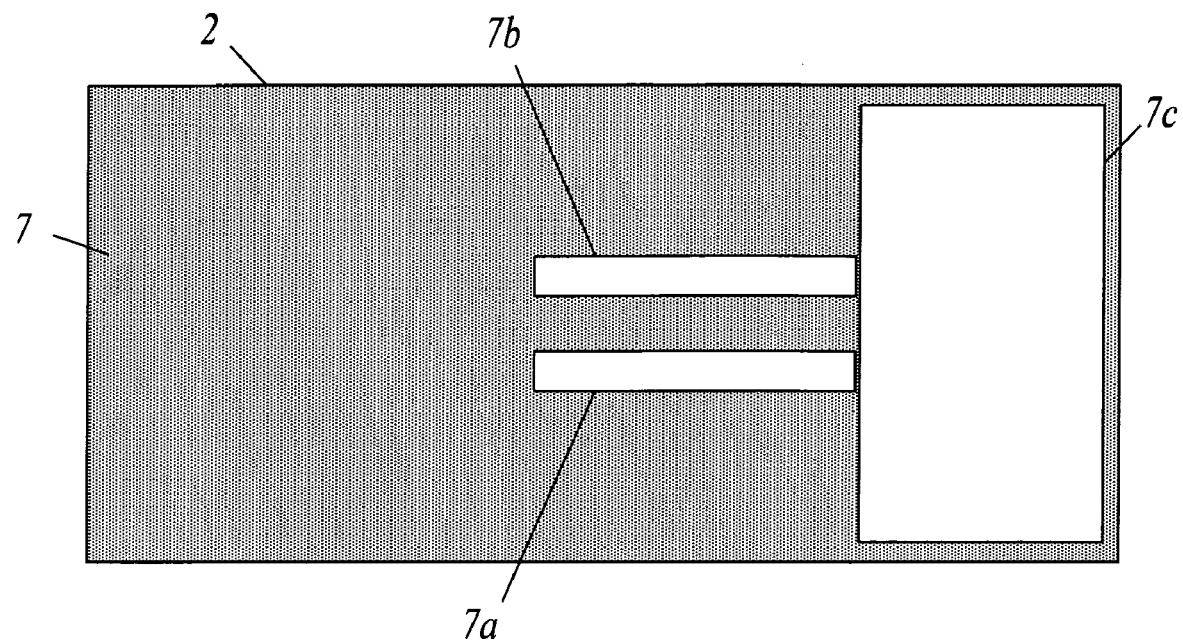
FIG. 2A is a diagram showing a mask 7 formed on a substrate 2.

First, as shown in FIG. 2A, a mask 7 with opening areas 7a and 7b for mounting the optical fibers and an opening area 7c for mounting the covering section formed adjacent to each other is formed on the surface of the substrate 2 by photolithography and etching.

Figure 2B:
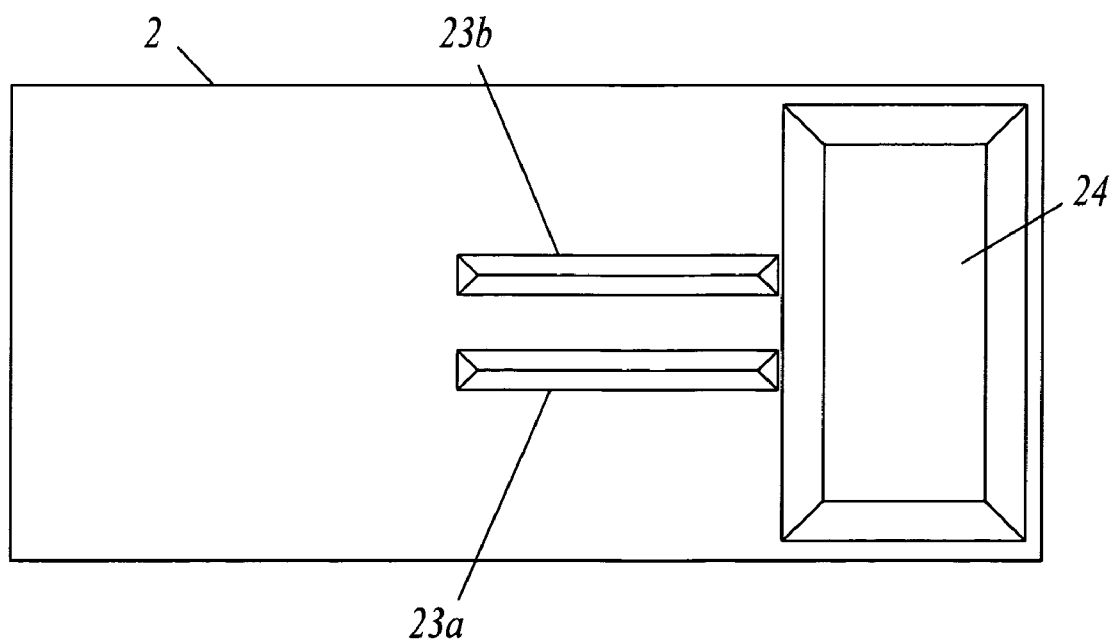
FIG. 2B is a diagram showing a substrate 2 after anisotropic wet etching processing.

Next, as shown in FIG. 2B, anisotropic wet etching processing is performed on the deep trench section 24 by a desired amount of etching. Potassium hydroxide (KOH), tetramethylammonium hydroxide (TMAH) or the like is used as an etchant. Here, as for the opening areas 7a and 7b for mounting the optical fibers, the etching stops when the V-shape of the V-grooves 23a and 23b are formed, and thus, there is no change in shape due to over-etching. Therefore, the V-grooves 23a and 23b and the deep trench section 24 can be formed at the same time.

Figure 3A:
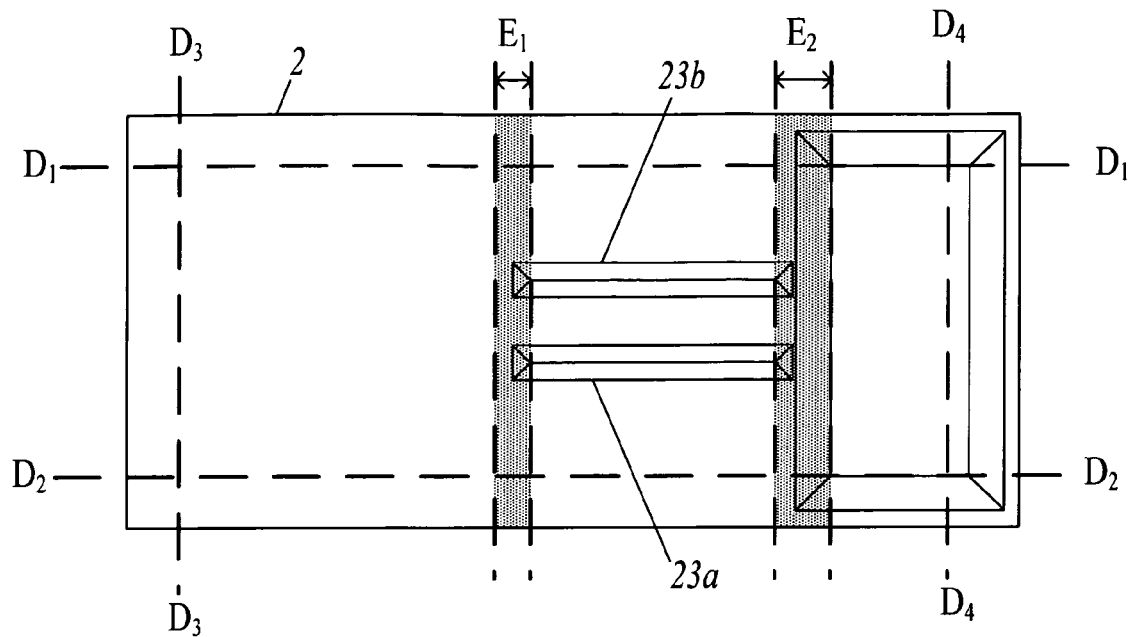
FIG. 3A is a diagram showing a location of cutting processing on the substrate 2.

Next, in order to cut out as a chip, cutting processing is performed on surrounding four sides of the substrate 2 in the position of $D_1$-$D_1$, $D_2$-$D_2$, $D_3$-$D_3$ and $D_4$-$D_4$ as shown in FIG. 3A, and is separated from an adjacent chip. Cutting processing is performed on both end sections $E_1$ and $E_2$ of the V-grooves 23a and 23b at a depth so as not to be separated from the substrate 2.

Figure 3B:
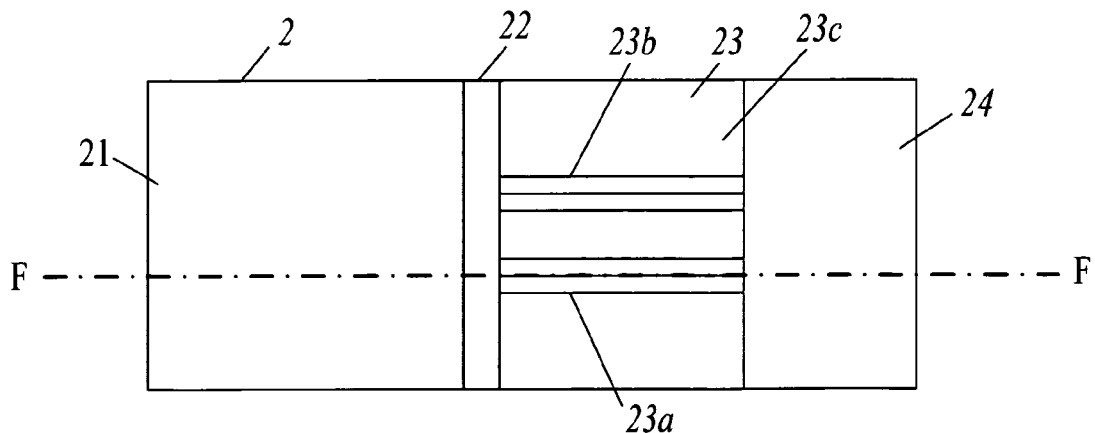
FIG. 3B is a top view showing the substrate 2 after cutting processing.
Figure 3C:
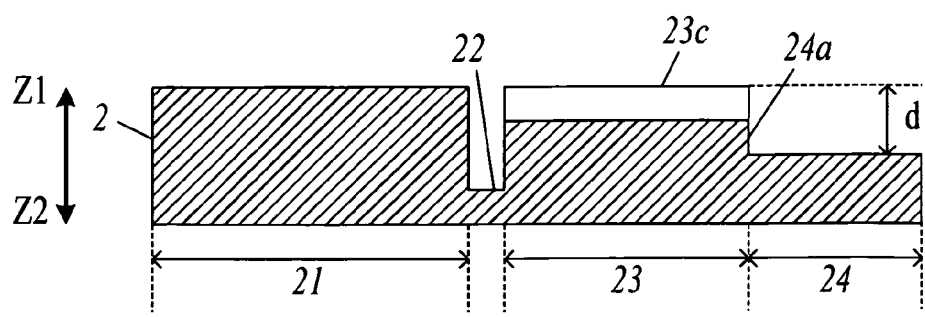
FIG. 3C is a cross-sectional view showing a cross-section taken along F-F shown in FIG. 3B.

FIG. 3B is a top view showing the substrate 2 after cutting processing, FIG. 3C is a cross-sectional view showing a cross-section taken along F-F shown in FIG. 3B. The portion where the end section $E_1$ of the V-grooves 23a and 23b is cut is to be the groove 22. The portion where the end section $E_2$ of the V-grooves 23a and 23b is cut is to be a portion of the deep trench section 24. As described above, the optical component setting section 21, the groove 22, the V-groove forming section 23 and the deep trench section 24 are formed on the substrate 2. As shown in FIG. 3C, the deep trench section 24 is deeper than the position of the V-groove forming face 23c by the predetermined depth d in the direction Z2.

Next, as shown in FIG. 1A and FIG. 1B, the PD 3 and the LD 4 are placed on the optical component setting section 21 and the optical fibers 5a and 5b are mounted with the end face 6a of the covering section 6 abutting the end face 24a of the deep trench section 24. Here, the distance h from the end face 3a of the PD 3 to the end face 24a of the deep trench section 24 (distance from the end face 4a of the LD 4 to the end face 24a of the deep trench section 24) is longer than the distance k from the end face 51a of the optical fiber 5a to the end face 6a of the covering section 6 (distance from the end face 51b of the optical fiber 5b to the end face 6a of the covering section 6), and the value of the distance z=h−k between the end face 3a of the PD 3 and the end face 51a of the optical fiber 5a (distance between the end face 4a of the LD 4 and the end face 51b of the optical fiber 5b) is defined by the distance h and the distance k.

Figure 4:
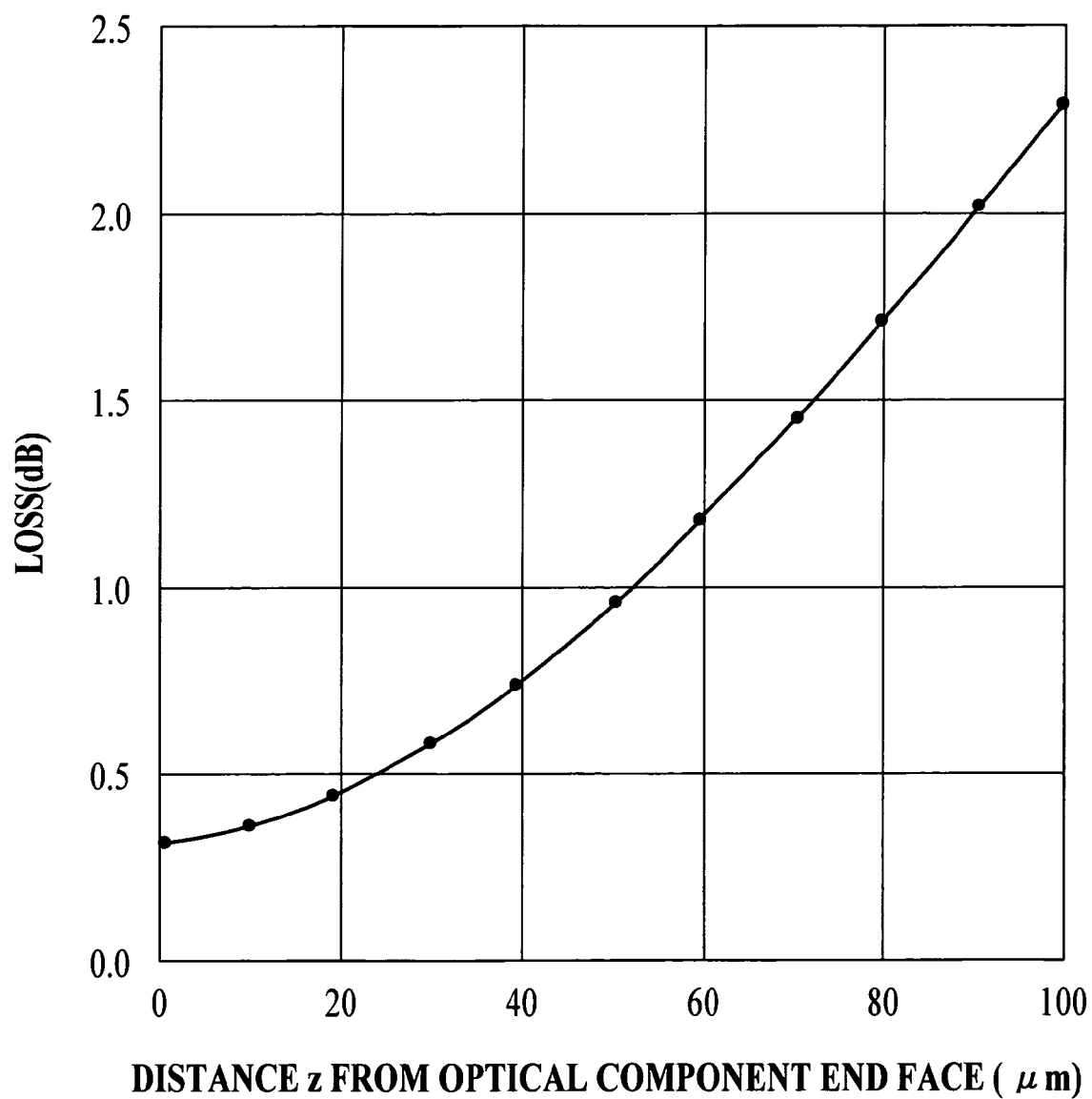
FIG. 4 is a graph showing a relationship between a distance z (μm) from an optical component end face to an optical fiber end face and loss (dB)

FIG. 4 shows a relationship between a distance z (μm) from the end face 3a of the PD 3 to the end face 51a of the optical fiber 5a (distance from the end face 4a of the LD 4 to the end face 51b of the optical fiber 5b) and loss (dB). FIG. 4 is a result of calculation when the refractive index of the core is 1.534, the refractive index of the cladding is 1.525, and the refractive index of the adhesive is 1.570. The value of the loss at distance z minus loss at the contact state (z=0 μm), in other words, the value of excess loss due to the gap is 0.04 dB when z=10 μm, 0.12 dB when z=20 μm, and 0.26 dB when z=30 μm. It is desirable to set distance z to 20 μm or less in order that the increase in loss from the contact state (z=0 μm) is 0.1 dB or less.

Next, with the optical fibers 5a and 5b and the covering section 6 mounted on the substrate 2, the optical fibers 5a and 5b are pressed by the cover glass 8 to be fixed and adhesive is flowed in to bond the optical fibers 5a and 5b to the V-grooves 23a and 23b and the covering section 6 to the deep trench section 24.

As described above, since the optical fibers 5a and 5b do not directly abut the edge of the substrate 2 and the covering section 6 abuts the edge of the substrate 2, stress concentration does not occur in the boundary between the portions of the optical fibers 5a and 5b fixed on the substrate 2 and those unfixed on the substrate 2. Since the covering section 6 is placed in the deep trench section 24, the bend of the optical fibers 5a and 5b can be prevented. Consequently, breaking of the optical fibers 5a and 5b can be avoided to enhance ease of handling in the assembly process and mechanical reliability including resistance to impact.

By anisotropic wet etching processing, the V-grooves 23a and 23b and the deep trench section 24 can be formed at the same time, and consequently the production process can be simplified.

By mounting the optical fibers 5a and 5b with abutting the end face 6a of the covering section 6 to the end face 24a of the deep trench section 24, the distance z between the end face 51a of the optical fiber 5a and the end face 3a of the PD 3, and between the end face 51b of the optical fiber 5b and the end face 4a of the LD 4 is defined. Thus, element destruction caused by contact between the end face 51a of the optical fiber 5a and the end face 3a of the PD 3, and between the end face 51b of the optical fiber 5b and the end face 4a of the LD 4 can be avoided, and the end faces 51a and 51b of the optical fibers 5a and 5b can be accurately placed at a position in a distance z from the end faces 3a and 4a of the PD 3 and the LD4, respectively. Consequently, mounting yield can be improved by an easy method and an optical module 1 with low loss can be provided.

SECOND EMBODIMENT

Next, the second embodiment applying the present invention will be described.

Figure 5A:
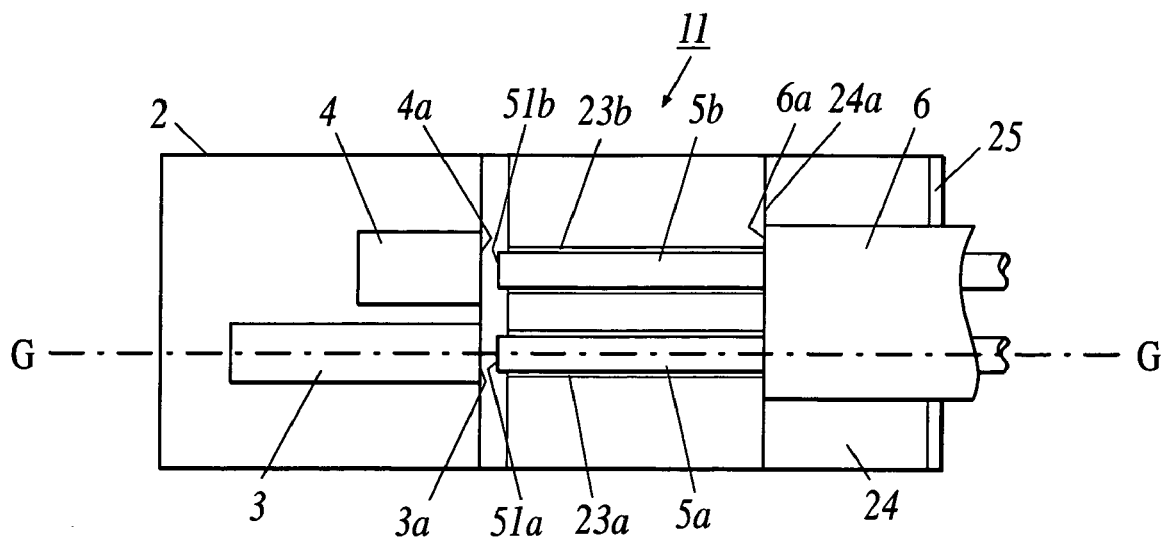
FIG. 5A is a top view showing an optical module 11 of the second embodiment.
Figure 5B:
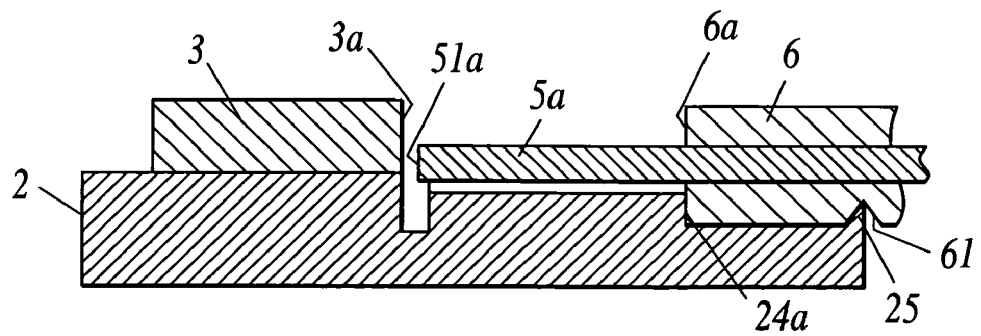
FIG. 5B is a cross-sectional view showing a cross-section taken along G-G shown in FIG. 5A.
Figure 6A:
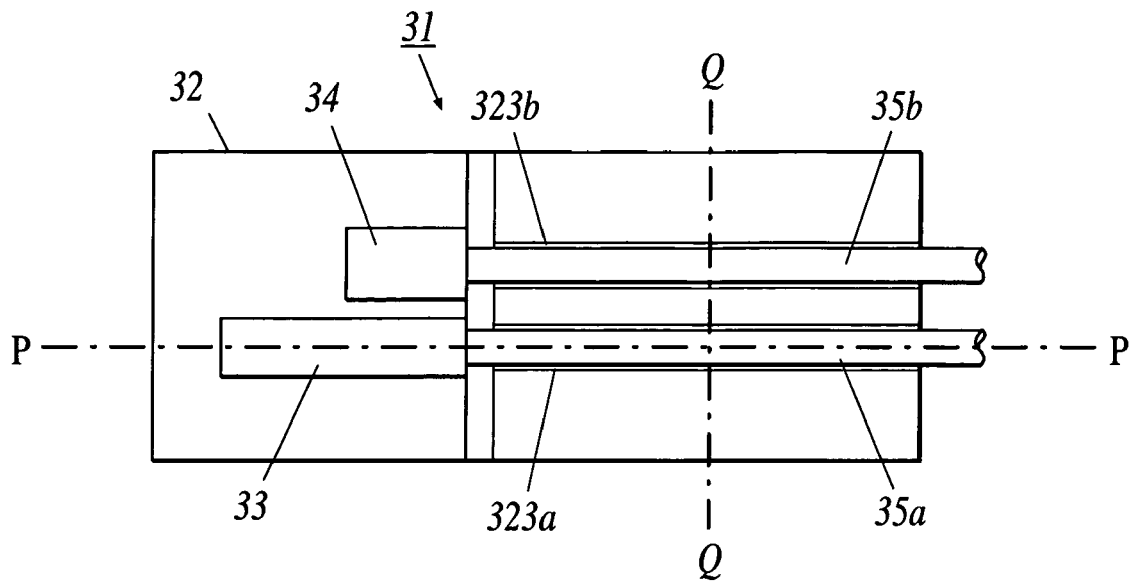
FIG. 6A is a top view showing an optical module 31.
Figure 6B:
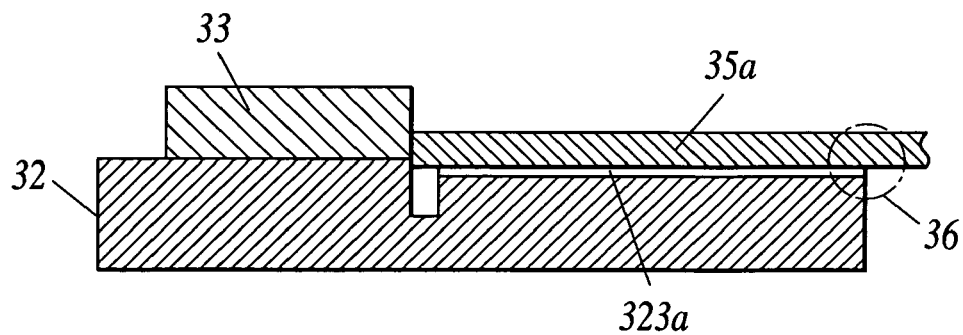
FIG. 6B is a cross-sectional view showing a cross-section taken along P-P shown in FIG. 6A.
Figure 6C:
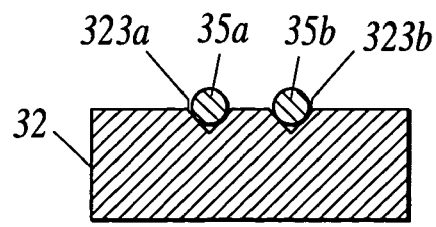
FIG. 6C is an end view showing an end face taken along Q-Q shown in FIG. 6A.

FIG. 5A is a top view showing an optical module 11 of the second embodiment, FIG. 5B is a cross-sectional view showing a cross-section taken along G-G shown in FIG. 5A. The optical module 11 has a similar structure to that of the optical module 1 shown in the first embodiment, thus the same reference numerals will be applied to the same components, and the description of the structure will be omitted. Actually, in the optical module 11 also, the optical fibers 5a and 5b are pressed and fixed by the cover glass from above, however the illustration is omitted in FIG. 5A and FIG. 5B. The characteristic structure of the second embodiment will be described below.

In the optical module 11, an alignment concavo-convex section is provided on the substrate 2 and the covering section 6. As shown in FIG. 5A and FIG. 5B, an alignment convex section 25 is formed at the edge of the deep trench section 24 of the substrate 2. The alignment convex section 25 is formed in the cutting process of the producing method of the optical module 1 described in the first embodiment by cutting so as to leave an inclined face formed by the anisotropic wet etching processing.

An alignment concave section 61 is formed on the covering section 6 so as to fit with the alignment convex section 25. The alignment concave section 61 is formed by cutting the covering section 6.

The position of the covering section 6 is defined by fitting the alignment convex section 25 formed on the substrate 2 to the alignment concave section 61 formed on the covering section 6.

As described above, it is preferable in the processing that the alignment concave section 61 is provided on the covering section 6 and the alignment convex section 25 is provided on the substrate 2. It is desirable that the alignment convex section 25 and the alignment concave section 61 are provided in a position so that when the optical fibers 5a and 5b and the covering section 6 are mounted on the substrate 2, the distance between the end face 51a of the optical fiber 5a and the end face 3a of the PD 3, and between the end face 51b of the optical fiber 5b and the end face 4a of the LD 4 is 20 μm or less (see FIG. 4).

As described above, by mounting the optical fibers 5*a* and 5*b* and the covering section 6 so that the alignment convex section 25 and the alignment concave section 61 fit, the distance between the end face 51*a* of the optical fiber 5*a* and the end face 3*a* of the PD 3, and between the end face 51*b* of the optical fiber 5*b* and the end face 4*a* of the LD 4 is defined. Consequently, element destruction caused by contact between the end face 51*a* of the optical fiber 5*a* and the end face 3*a* of the PD 3, and between the end face 51*b* of the optical fiber 5*b* and the end face 4*a* of the LD 4 can be avoided, and the optical fibers 5*a* and 5*b* can be placed in accurate positions. As a result, mounting yield can be improved by an easy method and an optical module 11 with low loss can be provided.

The optical module 11 is an example of the alignment convex section 25 positioned at the edge of the deep trench section 24, however the alignment concavo-convex section may be in a midway portion of the deep trench section 24, or one optical fiber may correspond to a plurality of concavo-convex sections.

The descriptions of the above-described embodiments are examples of an optical module of the present invention, and the present invention is not limited to the embodiments shown. The detailed structure of the portions comprising the optical module may be suitably modified without leaving the scope of the spirit of the invention.

For example, in the above-described embodiments, an example comprising the PD 3 and the LD 4 as the optical components was described, however, the optical components placed in the optical module may be an optical waveguide, mirror, polarizer or the like.

In the above-described embodiments, the method of forming the V-grooves 23*a* and 23*b* and deep trench section 24 by anisotropic wet etching processing on the substrate 2 was described, however, the V-grooves 23*a* and 23*b* and the deep trench section 24 may be formed by cutting processing on the substrate 2.

The number of cores of the optical fiber placed on the substrate 2 may be one core, two cores, four cores, etc., and may be any number. The optical fiber may be a silica-based fiber or a plastic fiber, and the optical fiber may be a single-mode fiber or a multi-mode fiber.

In the above-described embodiments, the optical module with the V-groove formed on one end of the optical component is described, however, V-grooves may be formed on both input and output ends of an optical component such as a splitter for splitting an optical signal into a plurality of output.

INDUSTRIAL APPLICABILITY

The optical module and the method of producing the optical module of the present embodiment may be applied to the field of optical communication.

DESCRIPTION OF REFERENCE NUMERALS 1, 11 optical module
2 substrate
21 optical component setting section
22 groove
23 V-groove forming section
23*a*, 23*b* V-groove
23*c* V-groove forming face
24 deep trench section
24*a* end face
25 alignment convex section
3 PD
3*a* end face
4 LD
4*a* end face
5*a*, 5*b* optical fiber
51*a*, 51*b* end face
6 covering section
6*a* end face
61 alignment concave section
7 mask
8 cover glass
31 optical module
32 substrate
323*a*, 323*b* V-groove
33 PD
34 LD
35*a*, 35*b* optical fiber

The invention claimed is:

1. An optical module in which an optical component and an optical fiber are mounted on a same substrate, and an end face of the optical component where light enters or exits faces an end face of an axis direction of the optical fiber, wherein:
   a V-groove is formed in a V-groove-formed face of the substrate to mount the optical fiber;
   a deep trench section is formed at an edge of the substrate on a side of the substrate to which the optical fiber extends, wherein the deep trench section has a predetermined depth that is deeper than a position of the V-groove-formed face of the substrate; and
   a covering section is placed in the deep trench section, wherein the covering section covers the optical fiber.

2. The optical module according to claim 1, wherein a distance h from the end face of the optical component facing the end face of the optical fiber to an end face of the deep trench section and a distance k from the end face of the optical fiber facing the end face of the optical component to an end face of the covering section facing an exposed side of the optical fiber satisfy a relationship of h>k.

3. The optical module according to claim 1, wherein each of the substrate and the covering section includes an alignment concavo-convex section.

4. A method of producing an optical module in which an optical component and an optical fiber are mounted on a same substrate, and an end face of the optical component where light enters or exits faces an end face of an axis direction of the optical fiber, the method comprising:
   forming a V-groove in a V-groove-formed surface of the substrate to mount the optical fiber;
   forming a deep trench section at an edge of the substrate on a side of the substrate to which the optical fiber extends, wherein the deep trench section has a predetermined depth that is deeper than a position of the V-groove-formed face of the substrate; and
   mounting the optical fiber in the V-groove and placing a covering section in the deep trench section, wherein the covering section covers the optical fiber.

5. The method of producing the optical module according to claim 4, wherein:
   a distance h from the end face of the optical component facing the end face of the optical fiber to an end face of the deep trench section and a distance k from the end face of the optical fiber facing the end face of the optical component to an end face of the covering section facing an exposed side of the optical fiber satisfy a relationship of h>k; and
   the optical fiber is mounted by abutting the end face of the covering section to the end face of the deep trench section.

6. The method of producing the optical module according to claim 4, wherein:

alignment concavo-convex sections are formed on the substrate and the covering section, respectively; and a position of the optical fiber is defined by fitting the alignment concavo-convex section formed on the substrate with the alignment concavo-convex section formed on the covering section.

7. The method of producing the optical module according to claim 4, wherein the V-groove and the deep trench section are formed by anisotropic wet etching processing on the substrate.

8. The method of producing the optical module according to claim 4, wherein the V-groove and the deep trench section are formed by cutting processing on the substrate.

* * * * *